United States Patent
Bretan et al.

(10) Patent No.: US 11,341,945 B2
(45) Date of Patent: May 24, 2022

(54) TECHNIQUES FOR LEARNING EFFECTIVE MUSICAL FEATURES FOR GENERATIVE AND RETRIEVAL-BASED APPLICATIONS

(71) Applicant: Samsung Electronics Co., Ltd., Suwon-si (KR)

(72) Inventors: Peter M. Bretan, Novato, CA (US); Larry P. Heck, Los Altos, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 16/704,600

(22) Filed: Dec. 5, 2019

(65) Prior Publication Data

US 2021/0049989 A1    Feb. 18, 2021

Related U.S. Application Data

(60) Provisional application No. 62/928,700, filed on Oct. 31, 2019, provisional application No. 62/887,416, filed on Aug. 15, 2019.

(51) Int. Cl.
 G10H 1/00    (2006.01)
 G06N 3/04    (2006.01)
 (Continued)

(52) U.S. Cl.
 CPC ......... G10H 1/0025 (2013.01); G06F 16/638 (2019.01); G06K 9/623 (2013.01);
 (Continued)

(58) Field of Classification Search
 CPC ............... G10H 1/0025; G10H 1/0008; G10H 2220/351; G10H 2220/371;
 (Continued)

(56) References Cited

U.S. PATENT DOCUMENTS 9,519,859 B2    12/2016 Huang et al.
10,068,557 B1 *    9/2018 Engel ...................... G06N 3/04
(Continued)

FOREIGN PATENT DOCUMENTS

KR    10-2018-0066472 A    6/2018
KR    10-2018-0070340 A    6/2018
(Continued)

OTHER PUBLICATIONS

International Search Report and Written Opinion of the International Searching Authority in connection with International Patent Application No. PCT/KR2020/007079 dated Sep. 9, 2020, 10 pages.

(Continued)

*Primary Examiner* — Michael S Osinski

(57) ABSTRACT

A method includes receiving a non-linguistic input associated with an input musical content. The method also includes, using a model that embeds multiple musical features describing different musical content and relationships between the different musical content in a latent space, identifying one or more embeddings based on the input musical content. The method further includes at least one of: (i) identifying stored musical content based on the one or more identified embeddings or (ii) generating derived musical content based on the one or more identified embeddings. In addition, the method includes presenting at least one of: the stored musical content or the derived musical content. The model is generated by training a machine learning system having one or more first neural network components and one or more second neural network components such that embeddings of the musical features in the latent space have a predefined distribution.

21 Claims, 11 Drawing Sheets

(51) Int. Cl.
*G06K 9/62* (2022.01)
*G06F 16/638* (2019.01)

(52) U.S. Cl.
CPC ......... *G06K 9/6256* (2013.01); *G06K 9/6276* (2013.01); *G06N 3/0454* (2013.01)

(58) Field of Classification Search
CPC .......... G10H 2220/395; G10H 2210/031–041; G10H 2210/066; G10H 2240/141; G10H 2240/081; G10H 2240/131; G10H 2240/145; G10H 2240/151; G10H 2240/155; G10H 2250/311; G06F 16/638; G06K 9/623; G06K 9/6256; G06K 9/6276; G06K 9/6272; G06N 3/0454; G06N 3/0445; G06N 3/088; G06N 3/08; G06N 3/04; G06N 3/084; G06N 3/0472; G06N 3/02; G10L 25/30; G10L 25/51; G10L 25/54
See application file for complete search history.

(56) References Cited

U.S. PATENT DOCUMENTS

| | | | |
|---|---|---|---|
| 10,198,697 B2 | 2/2019 | Christian et al. | |
| 10,489,701 B2 | 11/2019 | Weston et al. | |
| 2003/0040904 A1* | 2/2003 | Whitman | G10L 17/02 704/212 |
| 2008/0040123 A1* | 2/2008 | Shishido | G10H 1/0008 704/503 |
| 2008/0281590 A1* | 11/2008 | Breebaart | G10H 1/0008 704/231 |
| 2009/0069914 A1* | 3/2009 | Kemp | G10H 1/0008 700/94 |
| 2011/0112994 A1* | 5/2011 | Goto | G06Q 30/02 706/12 |
| 2012/0233164 A1* | 9/2012 | Rowe | G06F 16/637 707/737 |
| 2012/0316660 A1* | 12/2012 | Luo | G06F 16/78 700/94 |
| 2014/0019390 A1* | 1/2014 | Glennon | G06N 20/00 706/12 |
| 2014/0108020 A1* | 4/2014 | Sharma | G10L 25/87 704/500 |
| 2018/0276540 A1* | 9/2018 | Xing | G06N 3/0454 |
| 2018/0341702 A1* | 11/2018 | Sawruk | G06N 3/0454 |
| 2019/0130032 A1* | 5/2019 | Donier | G10L 25/30 |
| 2019/0166435 A1* | 5/2019 | Crow | H04R 25/505 |
| 2019/0197187 A1* | 6/2019 | Zhang | G06N 3/08 |
| 2019/0341058 A1* | 11/2019 | Zhang | G06K 9/00771 |
| 2020/0077184 A1* | 3/2020 | Mizuno | G10L 25/51 |
| 2020/0105303 A1* | 4/2020 | Conejo | G11B 27/031 |
| 2020/0168208 A1* | 5/2020 | Mitra | G10L 15/075 |
| 2020/0252682 A1* | 8/2020 | Walker | H04N 21/6583 |
| 2020/0293875 A1* | 9/2020 | Zhang | G10L 21/0208 |
| 2020/0349921 A1* | 11/2020 | Jansen | G06N 3/04 |
| 2020/0372924 A1* | 11/2020 | Kumar | G06F 16/48 |
| 2020/0394213 A1* | 12/2020 | Li | G06F 16/438 |
| 2020/0412822 A1* | 12/2020 | Allen | H04L 65/4092 |
| 2021/0005067 A1* | 1/2021 | Salekin | G10L 25/30 |
| 2021/0005173 A1* | 1/2021 | Maezawa | G10G 1/00 |
| 2021/0012200 A1* | 1/2021 | Lyske | G10H 1/0008 |
| 2021/0021953 A1* | 1/2021 | Kim | G06N 3/08 |
| 2021/0050033 A1* | 2/2021 | Bui | G06N 3/08 |
| 2021/0174812 A1* | 6/2021 | Gao | G10L 17/22 |
| 2021/0193167 A1* | 6/2021 | Jiang | G10L 15/26 |
| 2021/0227291 A1* | 7/2021 | Wolowiec | G06N 3/04 |

FOREIGN PATENT DOCUMENTS

| | | |
|---|---|---|
| KR | 10-1934057 B1 | 4/2019 |
| WO | 2019040132 A1 | 2/2019 |

OTHER PUBLICATIONS

Makhzani et al., "Adversarial Autoencoders", International Conference on Learning Representations (2016), May 2016, 16 pages.

Brunner et al., "MIDI-VAE: Modeling Dynamics and Instrumentation of Music with Applications to Style Transfer", Proceedings of the 19th International Society for Music Information Retrieval (ISMIR) Conference, Sep. 2018, pp. 747-754.

Madjiheurem et al., "Chord2Vec: Learning Musical Chord Embeddings", 30th Conference on Neural Information Processing Systems (NIPS 2016), Nov. 2016, 5 pages.

Mikolov et al., "Efficient Estimation of Word Representations in Vector Space", ICLR 2013, Jan. 2013, 12 pages.

Roberts et al., "A Hierarchical Latent Vector Model for Learning Long-Term Structure in Music", International Conference on Machine Learning (ICML) (2018), Mar. 2018, 16 pages.

Engel et al., "GANSynth: Adversarial Neural Audio Synthesis", Seventh International Conference on Learning Representations, Feb. 2019, 17 pages.

"Music VAE—Understanding of Google's work for interpolating long music sequences", Medium, May 2019, 23 pages.

* cited by examiner

TECHNIQUES FOR LEARNING EFFECTIVE MUSICAL FEATURES FOR GENERATIVE AND RETRIEVAL-BASED APPLICATIONS

CROSS-REFERENCE TO RELATED APPLICATIONS AND PRIORITY CLAIM

This application claims priority under 35 U.S.C. § 119(e) to U.S. Provisional Patent Application No. 62/887,416 filed on Aug. 15, 2019 and U.S. Provisional Patent Application No. 62/928,700 filed on Oct. 31, 2019. Both of these provisional applications are hereby incorporated by reference in their entirety.

TECHNICAL FIELD

This disclosure relates generally to machine learning systems. More specifically, this disclosure relates to techniques for learning effective musical features for generative and retrieval-based applications.

BACKGROUND

Music is inherently complex, and a single motif or style of music can often be described along a multitude of dimensions. Some dimensions may describe music in broad terms and capture properties that offer a more aggregate representation of the music. These dimensions may include musical features such as tonality, note density, complexity, and instrumentation. Other dimensions may describe music by considering the sequential nature and temporal facets of the music. Those dimensions may include musical features such as syncopation, harmonic progression, pitch contour, and repetition.

In recent years, neural networks have been used to learn a low-dimensional latent "musical space" that encapsulates these types of musical features. Different musical passages can be associated with or represented by different embeddings in the space, such as different vectors within the space. A distance between two embeddings in the space may be used as a measure of the similarity between two musical passages. Musical passages that are more similar to one another can be represented by embeddings separated by a smaller distance. Musical passages that are less similar to one another can be represented by embeddings separated by a larger distance.

SUMMARY

This disclosure provides techniques for learning effective musical features for generative and retrieval-based applications.

In a first embodiment, a method includes receiving a non-linguistic input associated with an input musical content. The method also includes, using a model that embeds multiple musical features describing different musical content and relationships between the different musical content in a latent space, identifying one or more embeddings based on the input musical content. The method further includes at least one of: (i) identifying stored musical content based on the one or more identified embeddings or (ii) generating derived musical content based on the one or more identified embeddings. In addition, the method includes presenting at least one of: the stored musical content or the derived musical content. The model is generated by training a machine learning system having one or more first neural network components and one or more second neural network components such that embeddings of the musical features in the latent space have a predefined distribution.

In a second embodiment, an electronic device includes at least one memory, at least one speaker, and at least one processor operatively coupled to the at least one memory and the at least one speaker. The at least one processor is configured to receive a non-linguistic input associated with an input musical content. The at least one processor is also configured, using a model that embeds multiple musical features describing different musical content and relationships between the different musical content in a latent space, to identify one or more embeddings based on the input musical content. The at least one processor is further configured to at least one of: (i) identify stored musical content based on the one or more identified embeddings or (ii) generate derived musical content based on the one or more identified embeddings. In addition, the at least one processor is configured to present, via the at least one speaker, at least one of: the stored musical content or the derived musical content. The model is generated by training a machine learning system having one or more first neural network components and one or more second neural network components such that embeddings of the musical features in the latent space have a predefined distribution.

In a third embodiment, a non-transitory machine-readable medium contains instructions that when executed cause at least one processor of an electronic device to receive a non-linguistic input associated with an input musical content. The medium also contains instructions that when executed cause the at least one processor, using a model that embeds multiple musical features describing different musical content and relationships between the different musical content in a latent space, to identify one or more embeddings based on the input musical content. The medium further contains instructions that when executed cause the at least one processor to at least one of: (i) identify stored musical content based on the one or more identified embeddings or (ii) generate derived musical content based on the one or more identified embeddings. In addition, the medium contains instructions that when executed cause the at least one processor to present at least one of: the stored musical content or the derived musical content. The model is generated by training a machine learning system having one or more first neural network components and one or more second neural network components such that embeddings of the musical features in the latent space have a predefined distribution.

In a fourth embodiment, a method includes receiving reference musical content, positive musical content similar to the reference musical content, and negative musical content not similar to the reference musical content. The method also includes generating a model that embeds multiple musical features describing the reference musical content, the positive musical content, and the negative musical content and relationships between the reference musical content, the positive musical content, and the negative musical content in a latent space. Generating the model includes training a machine learning system having one or more first neural network components and one or more second neural network components such that embeddings of the musical features in the latent space have a predefined distribution.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
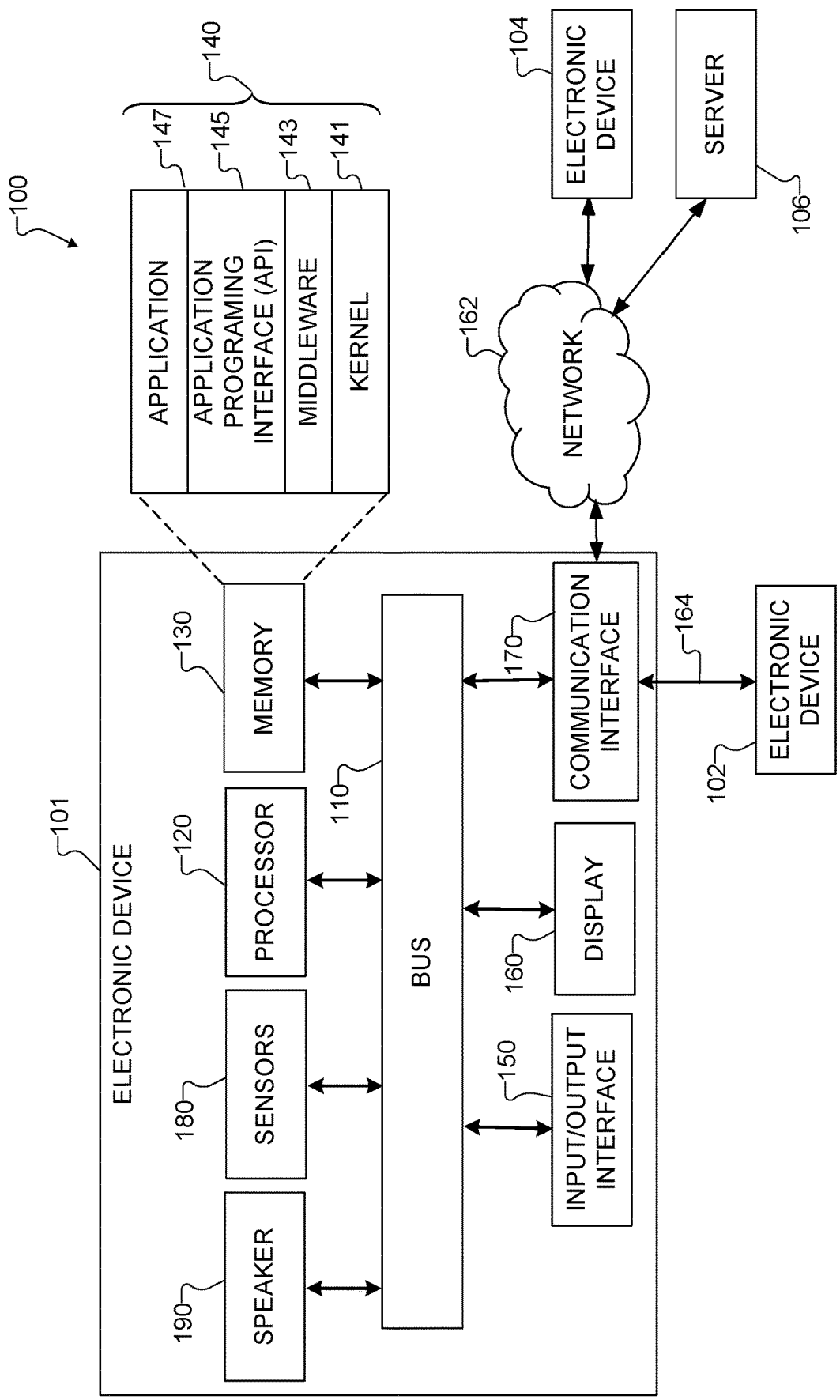
FIG. 1 illustrates an example network configuration including an electronic device in accordance with this disclosure.

FIGS. 1 through 13, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, music is inherently complex and can often be described along multiple dimensions. Some dimensions may describe music in broad terms and capture properties that offer a more aggregate representation of the music, such as tonality, note density, complexity, and instrumentation. Other dimensions may describe music by considering the sequential nature and temporal facets of the music, such as syncopation, harmonic progression, pitch contour, and repetition. Neural networks have been used to learn a low-dimensional latent "musical space" that encapsulates such musical features, where different musical passages can be associated with or represented by different vectors or other embeddings in the space. A distance between two embeddings in the space can be used as a measure of the similarity between two musical passages. This means that, at a high level, embeddings of similar musical content should be geometrically closer in the latent space than dissimilar musical content.

For certain tasks, effectively learning this latent space can be important in order to help ensure that music is identified, selected, generated, or otherwise used in a manner that conforms to human expectations. This can be particularly true in interactive applications where a machine's response is typically conditioned on a human performer. Thus, an effective embedding of musical features can be used to interpret music in a manner that correlates with human perceptions. This type of embedding captures features useful for downstream tasks and conforms to a distribution suitable for sampling and meaningful interpolation. Unfortunately, learning useful musical features often comes at the expense of being able to effectively generate or decode from the learned musical features (and vice versa).

This disclosure provides techniques for learning effective musical features for generative and retrieval-based applications. These techniques have the ability to learn meaningful musical features and to conform to a useful distribution of those musical features as embedded in a latent musical space. These techniques leverage context and simultaneously impose a shape on the distribution of the features in the latent space, such as via backpropagation, using an adversarial component. This allows jointly optimizing for desired characteristics by leveraging context (which improves features) and constraining the distribution in the latent space (which makes generative sampling possible). In lieu of explicitly labeled data, neural network components or other machine learning algorithms can be trained under the assumption that two adjacent units of musical content (such as two adjacent passages or sections in the same musical composition) are related. In other words, the distance between embeddings of two adjacent units of the same musical content in the latent space should be smaller than embeddings of two random unrelated units of musical content in the latent space.

Among other things, musical content can be analyzed, and its features can be projected into a continuous low-dimensional space that has relevance to a human listener while maintaining a desired distribution within that low-dimensional space. Thus, these techniques can be used to effectively learn the feature space by embedding numerous relevant musical features into the space. Also, these approaches allow a single machine learning model to be trained and used for various downstream tasks. Often times, one unique model is trained for each particular task since performance typically degrades across tasks when training a single model for multiple tasks. Each model trained using the techniques described in this disclosure can be used to perform various functions, such as searching for specific musical content based on audible non-linguistic input, ranking musical content most similar to audible non-linguistic input, selecting specific musical content for playback based on audible non-linguistic input, and autonomously generating music based on audible non-linguistic input. Further, the described techniques can jointly optimize multiple loss functions (such as by using backpropagation) for embedding context, self-reconstruction, and constraining distribution. Since a single model can be used for multiple tasks, multiple loss functions can be optimized concurrently, and the distribution of features in the latent space can be constrained so that the distribution conforms to a particular subspace. This distribution allows effective features to be learned using additional loss functions that utilize context. In addition, a trained machine learning model can be used to achieve improved performance in one or more downstream tasks.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, a sensor 180, or a speaker 190. In some embodiments, the electronic device 101 may exclude at least one of these components or may add at least one other component. The bus 110 includes a circuit for connecting the components 120-190 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. For example, the processor 120 may be used for training in order to learn effective musical features, such as by embedding a large amount of different musical content into a latent space in a desired distribution. The processor 120 may also or alternatively use a trained machine learning model for one or more generative and retrieval-based applications, such as searching, ranking, playing, or generating musical content.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for machine learning and/or trained machine learning model use as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The electronic device 101 further includes one or more sensors 180 that can meter a physical quantity or detect an activation state of the electronic device 101 and convert metered or detected information into an electrical signal. For example, one or more sensors 180 can include one or more microphones, which may be used to capture non-linguistic audible input (such as a musical performance) from one or more users. The sensor(s) 180 can also include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In addition, the electronic device 101 includes one or more speakers 190 that can convert electrical signals into audible sounds. As described below, one or more speakers 190 may be used to play musical content to at least one user. The musical content that is played through the one or more speakers 190 may include musical content that accompanies a musical performance by the user(s), musical content related to input provided by the user(s), or musical content that is generated based on input provided by the user(s).

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, which include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
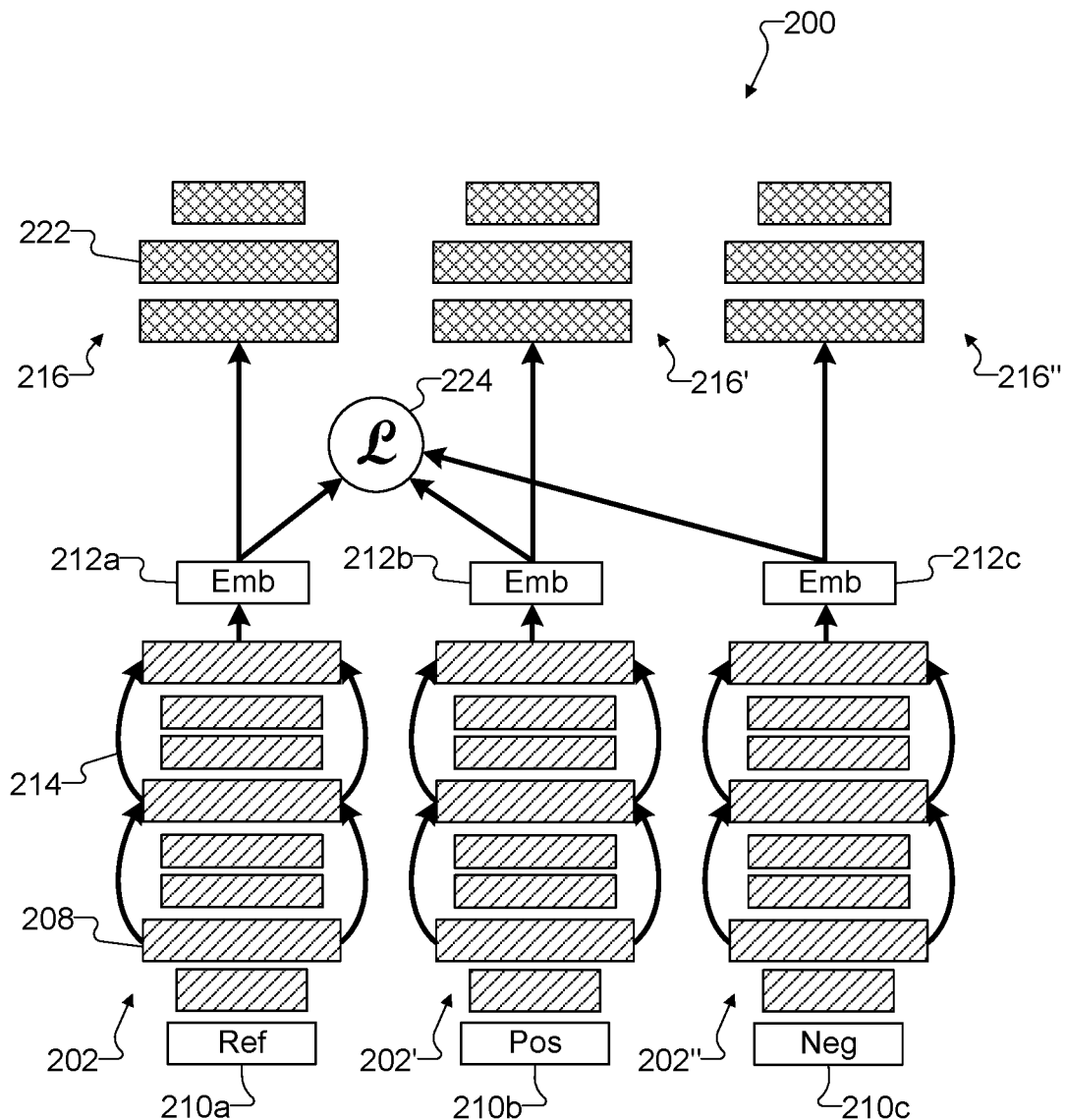
FIG. 2 illustrates a first example system for machine learning to identify effective musical features in accordance with this disclosure.

FIG. 2 illustrates a first example system 200 for machine learning to identify effective musical features in accordance with this disclosure. In particular, the system 200 shown in FIG. 2 may represent one model of machine learning that can be trained to learn a latent musical space by embedding relevant musical features into the space. The system 200 shown in FIG. 2 may be used in the network configuration 100 of FIG. 1, such as when the system 200 of FIG. 2 is implemented using or performed by the server 106 in the network configuration 100 of FIG. 1. Note, however, that the system 200 may be implemented using any other suitable device(s) and in any other suitable environment(s).

In the example embodiment of FIG. 2, the system 200 is implemented using a modified form of a Deep Structured Semantic Model (DSSM). More specifically, adversarial DSSM is used to implement the system 200. As shown in FIG. 2, the system 200 includes an embedding generator 202. Note that while FIG. 2 identifies the embedding generator 202 and two embedding generators 202' and 202", the embedding generators 202' and 202" may simply represent the same embedding generator 202 being used to process different information. Of course, more than one embedding generator may also be used here. The embedding generator 202 in this particular example includes a number of operational layers 208. The operational layers 208 in the embedding generator 202 generally operate to perform various operations to respectively convert non-linguistic audible input data 210a-210c into output embeddings 212a-212c. Each output embedding 212a-212c represents the musical features of the associated non-linguistic audible input data 210a-210c in the latent musical space.

The operational layers 208 in the embedding generator 202 may perform any suitable operations to generate an output embedding 212a-212c based on non-linguistic audible input data 210a-210c. In some embodiments, the embedding generator 202 represents a convolutional neural network that includes operational layers 208 such as one or more pooling layers, one or more normalization layers, one or more connected layers, and/or one or more convolution layers. Each pooling layer may select or combine outputs from a prior layer for input to a next layer. For instance, a pooling layer that uses maximum pooling identifies maximum outputs from clusters in the prior layer for input to the next layer, and a pooling layer that uses average pooling identifies averages of the outputs from clusters in the prior layer for input to the next layer. Each normalization layer may normalize the outputs from a prior layer for input to a next layer. Each connected layer may form connections for routing information between layers. Each convolution layer may apply a convolution operation to input in order to generate a result, which is output to a next layer. Lines 214 may be used here to represent optional connections between non-adjacent operational layers 208, which means that residuals or other data generated by one layer 208 can be provided to a non-adjacent layer 208. In particular embodiments, the embedding generator 202 may represent a fully-connected convolutional neural network. Note, however, that the specific type of machine learning algorithm and the connections between the layers used here for the embedding generator 202 can vary as needed or desired, and other types of machine learning algorithms may be used here as long as the machine learning algorithms can generate embeddings of musical content in a latent space.

The embedding generator 202 here is used to process different reference input data 210a and generate different embeddings 212a, to process different positive input data 210b and generate different embeddings 212b, and to process negative input data 210c and generate different embeddings 212c. The positive input data 210b is known to be similar to the reference input data 210a (at least with respect to the musical features being represented by the embeddings). In some cases, the reference input data 210a and the positive input data 210b may represent adjacent passages or sections in the same musical composition, helping to ensure similarity between the two. The negative input data 210c is known to be dissimilar to the reference input data 210a (at least with respect to the musical features being represented by the embeddings). In some cases, the reference input data 210a and the negative input data 210c may represent different passages or sections in different musical compositions (such as in different genres), helping to ensure dissimilarity between the two.

With a DSSM, if q(z) represents the aggregated posterior distribution of all embeddings of length d generated by the DSSM function $f(x)$ for $x \in X$, one goal of training the DSSM is to match q(z) to a predefined desired distribution p(z), which may be defined as $z_i \sim N_d(\mu, \sigma^2)$, where $\mu=0$ and $\sigma^2=1$. This can be achieved by connecting an adversarial discriminator 216 to the last layer of the embedding generator 202. Note that while FIG. 2 identifies the adversarial discriminator 216 and two adversarial discriminators 216' and 216", the adversarial discriminators 216' and 216" may simply represent the same adversarial discriminator 216 being used to process different information. Of course, more than one adversarial discriminator may also be used here. The adversarial discriminator 216 is trained adversarially in coalescence with the embedding generator 202 (which is itself a DSSM). The adversarial discriminator 216 generally operates to distinguish between generated embeddings 212a-212c and vectors sampled from q(z). The adversarial discriminator 216 thereby helps to ensure that the aggregated posterior distribution of the embeddings 212a-212c from the embedding generator 202 conforms to a predefined distribution. In some embodiments, the predefined distribution may be Gaussian and continuous, although other predefined distributions (such as a uniform distribution) may be used.

As can be seen in FIG. 2, the adversarial discriminator 216 includes several operational layers 222, which may be used to perform desired functions to support the adversarial discriminator 216. By using only several layers 222 to perform the actual discrimination, most of the good features for classification of musical content will need to be learned by the embedding generator 202. This forces the system 200 to embed the input data 210a-210c in a manner that not only efficiently encodes itself but that can also effectively distinguish itself from unrelated inputs. While three operational layers 222 are shown here, the adversarial discriminator 216 may include any suitable number of operational layers 222.

A loss function 224 is used during the training of the system 200 to help establish the proper parameters for the neural network(s) or other machine learning algorithm(s) forming the embedding generator 202. For example, the loss function 224 can be minimized during the training using approaches such as stochastic gradient descent.

Standard DSSM training is well-suited for metric learning since it explicitly trains parameters of a DSSM to produce embeddings that are closer together (according to a distance metric) for related items while pushing non-related items farther apart. However, the number of negative examples and the ratio of easy-to-hard examples is usually greatly biased towards the easy end. This often produces poor performance since many examples can satisfy the constraint with a very small loss that provides no real meaningful update during backpropagation. This typically leads to high inter-class variance and low intra-class variance, making fine grained categorization or meaningful similarity measures (important for music) challenging or impossible. To address this problem, a bootstrapping method was used in the past in which particularly difficult examples were manually mined from a dataset and used during different stages of training. Unfortunately, this requires manual intervention in the training process.

In some embodiments, the use of the adversarial discriminator 216 naturally helps to mitigate this problem by enforcing a predefined distribution in the embeddings produced by the embedding generator 202. During training, the parameters of the embedding generator 202 can be modified in order to find a way to achieve the desired similarity metric while adhering to a predefined distribution that does not allow for a learned space in which most examples can easily satisfy the similarity constraint.

In some embodiments, the system 200 shown in FIG. 2 can be trained in two stages. In the first stage, a standard or other suitable DSSM training technique may be used to train the embedding generator 202, and a loss (such as a softmax loss) can be computed using negative examples during this stage. In the second stage, the embedding generator 202 and the adversarial discriminator 216 are trained so that the adversarial discriminator 216 causes the embedding generator 202 to produce embeddings that look as if they have been sampled from the predefined distribution p(z). Thus, the parameters of the system 200 are being optimized according to two different losses, with one learning the similarity metric and the other learning to describe the data such that the aggregated posterior distribution of the embeddings satisfies the predefined distribution (which may be Gaussian and continuous in some embodiments).

For the first stage of the training, the embedding generator 202 may be trained using Euclidean similarity in some embodiments. The Euclidean similarity between two embeddings may be expressed as follows:

$$sim(\tilde{X}, \tilde{Y}) = \frac{1}{1 + D(\tilde{X}, \tilde{Y})} \quad (1)$$

where $\tilde{X}$ and $\tilde{Y}$ represent the two embeddings, $sim(\tilde{X}, \tilde{Y})$ represents the Euclidean similarity between the two embeddings, and $D(\tilde{X}, \tilde{Y})$ represents a Euclidean distance metric between the two embeddings in the latent feature space. In this example, the distance metric is expressed in terms of Euclidean distance, although other distance terms (such as cosine distance) may be used as a distance metric. Negative examples can be included in a softmax function in some embodiments to compute $P(\tilde{R}|\tilde{Q})$, where $\tilde{R}$ represents a reconstructed vector or other embedding and $\tilde{Q}$ represents an input vector or other embedding. This may be expressed as follows:

$$P(\tilde{R}|\tilde{Q}) = \frac{e^{sim(\tilde{Q},\tilde{R})}}{\sum_{\tilde{d} \in D} e^{sim(\tilde{Q},\tilde{d})}} \quad (2)$$

The system 200 trains the embedding generator 202 to learn its parameters by minimizing the loss function 224, such as by using stochastic gradient descent in some embodiments. This may be expressed as follows:

$$\mathcal{L} = -\log \Pi_{(Q,R)} P(\tilde{R}|\tilde{Q}) \quad (3)$$

For the second stage of the training, a generative adversarial network (GAN) training procedure may be used in some embodiments to train the embedding generator 202 and the adversarial discriminator 216. In a GAN training procedure, the adversarial discriminator 216 is first trained to distinguish between generated embeddings 212a-212c and vectors or other embeddings that are sampled from q(z). The embedding generator 202 is then trained to fool the associated adversarial discriminator 216. Some embodiments use a deterministic version of the GAN training procedure, where stochasticity comes solely from the data distribution, and no additional randomness needs to be incorporated.

Training alternates between the first stage using the DSSM procedure and the second stage using the GAN procedure until Equation (3) converges. A higher learning rate for the GAN procedure (particularly for updating the embedding generator 202) relative to the DSSM losses may help to obtain the desired results. Otherwise, the GAN-based updates may have very little or no effect, resulting in a model with a very similar behavior to the standard DSSM without any adversarial components.

Figure 3:
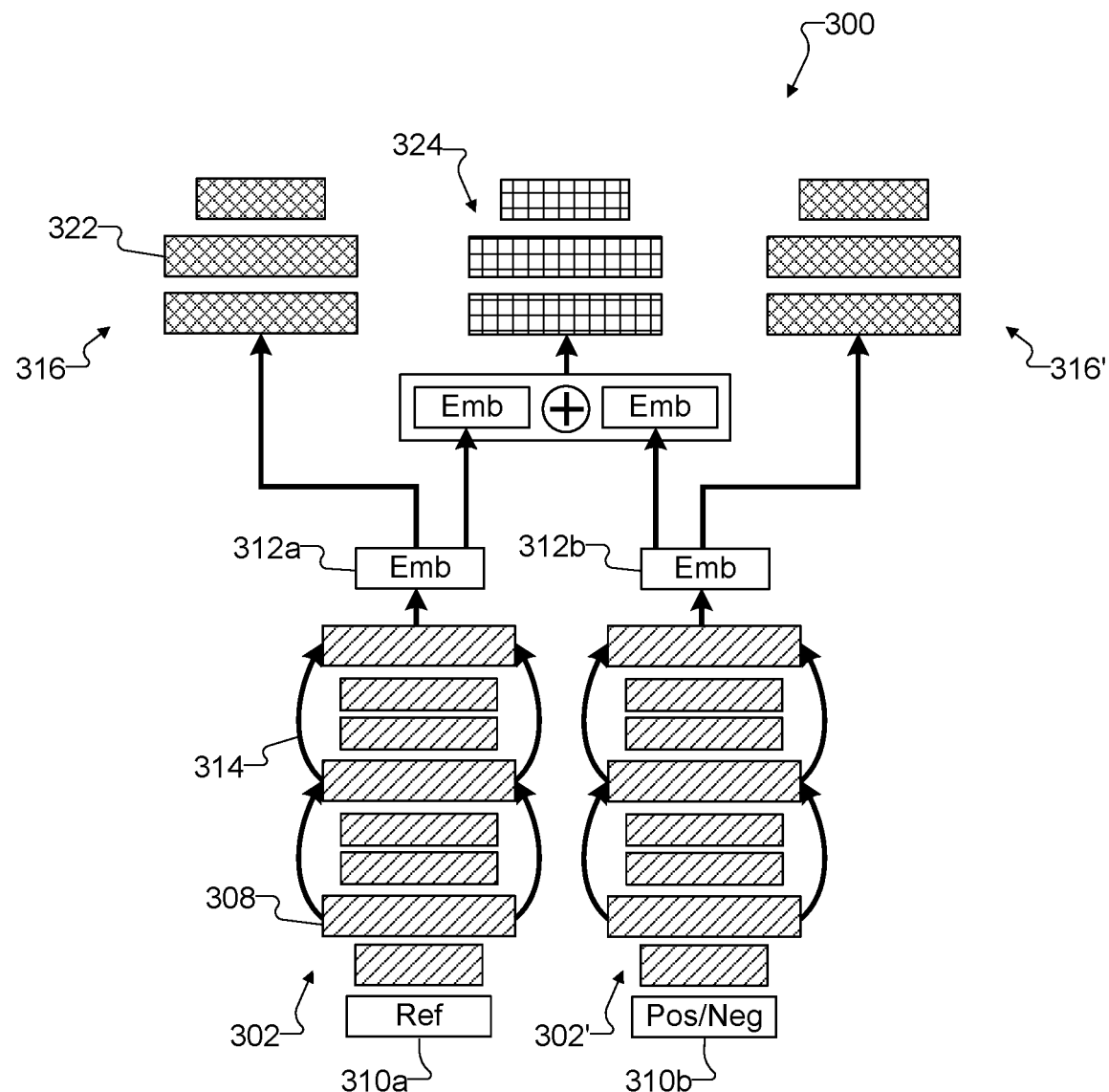
FIG. 3 illustrates a second example system for machine learning to identify effective musical features in accordance with this disclosure.

FIG. 3 illustrates a second example system 300 for machine learning to identify effective musical features in accordance with this disclosure. In particular, the system 300 shown in FIG. 3 may represent another model of machine learning that can be trained to learn a latent musical space by embedding relevant musical features into the space. The system 300 shown in FIG. 3 may be used in the network configuration 100 of FIG. 1, such as when the system 300 of FIG. 3 is implemented using or performed by the server 106 in the network configuration 100 of FIG. 1. Note, however, that the system 300 may be implemented using any other suitable device(s) and in any other suitable environment(s).

In the example embodiment of FIG. 3, the system 300 is implemented using an adversarial adjacency model, which may be said to represent a type of Siamese network paradigm. As shown in FIG. 3, the system 300 includes an embedding generator 302. Note that while FIG. 3 identifies the embedding generator 302 and an embedding generator 302', the embedding generator 302' may simply represent the same embedding generator 302 being used to process different information. Of course, more than one embedding generator may also be used here. The embedding generator 302 in this particular example includes a number of operational layers 308, which generally operate to perform various operations to respectively convert non-linguistic audible input data 310a-310b into output embeddings 312a-312b. Each output embedding 312a-312b represents the musical features of the associated non-linguistic audible input data 310a-310b in a defined latent musical space.

The operational layers 308 in the embedding generator 302 may perform any suitable operations to generate an output embedding 312a-312b based on non-linguistic audible input data 310a-310b. In some embodiments, the embedding generator 302 represents a convolutional neural network that includes operational layers 308 such as one or more pooling layers, one or more normalization layers, one or more connected layers, and/or one or more convolution layers. Lines 314 may be used to represent optional connections between non-adjacent operational layers 308, which means that residuals or other data generated by one layer 308 can be provided to a non-adjacent layer 308. In particular embodiments, the embedding generator 302 may represent a fully-connected convolutional neural network. Note, however, that the specific type of machine learning algorithm and the connections between the layers used here for the embedding generator 302 can vary as needed or desired, and other types of machine learning algorithms may be used here as long as the machine learning algorithms can generate embeddings of musical content in a latent space.

The embedding generator 302 here is used to process different reference input data 310a and generate different embeddings 312a and to process different positive or negative input data 310b and generate different embeddings 312b. The positive input data 310b is known to be similar to the reference input data 310a and the negative input data 310b is known to be dissimilar to the reference input data 310a (at least with respect to the musical features being represented by the embeddings). In some cases, the reference input data 310a and the positive input data 310b may represent adjacent passages or sections in the same musical composition, helping to ensure similarity between the two. Also, in some cases, the reference input data 310a and the negative input data 310b may represent different passages or sections in different musical compositions (such as in different genres), helping to ensure dissimilarity between the two.

Unlike the use of DSSMs in FIG. 2, the embeddings 312a-312b in FIG. 3 are not directly optimized for a desired metric. Instead, a classifier 324, which may be implemented using an adjacency discriminator, is trained to determine whether or not two input units (an embedding 312a and an embedding 312b) are related. Because adjacency is used as a self-supervising surrogate in lieu of manually-designed similarity labels, the classifier 324 may be trained here to determine whether or not two embeddings 312a and 312b represent musical content that would be contiguous in a musical composition.

In some embodiments, one version of the classifier 324 generates combined embeddings, where each combined embedding is formed by concatenating one embedding 312a with one embedding 312b to form a single classifier input. Thus, the combined embeddings may represent concatenated vectors. The combined embeddings are used to train the classifier 324 to produce a binary classification from each combined embedding. The binary classification can identify that an embedding 312a concatenated with an embedding 312b are related (when the embedding 312b is for positive input data 310b) or not related (when the embedding 312b is for negative input data 310b). However, one goal here may include being able to embed a single unit (a single embedding 312a or 312b). Therefore, some embodiments of the system 300 use tied weights in which lower layers of the embedding generator 302 are identical, and embeddings are not concatenated until several layers deep into the network. In other words, two inputs (input data 310a and input data 310b) are embedded independently, but the same parameters are used to perform the embeddings.

The classifier 324 is configured to use the concatenated embeddings 312a-312b to discriminate between related and non-related inputs. Again, by using only several layers to perform the actual discrimination in the classifier 324, most of the good features for classification of musical content will need to be learned by the embedding generator 302. This forces the system 300 to embed the input data 310a-310b in a manner that not only efficiently encodes itself but that can also effectively distinguish itself from unrelated inputs. The system 300 can achieve this by embedding related units closer together. Note that, for ease of comparison, part of the architecture of the system 300 may use the same DSSM-type networks shown in FIG. 2.

Once again, an adversarial discriminator 316 can be connected to the last layer of the embedding generator 302. Note that while FIG. 3 identifies the adversarial discriminator 316 and an adversarial discriminator 316', the adversarial discriminator 316' may simply represent the same adversarial discriminator 316 being used to process different information. Of course, more than one adversarial discriminator may also be used here. The adversarial discriminator 316 may operate in the same or similar manner as the adversarial discriminator 216. Again, one goal here is that the aggregated posterior distribution of the embeddings 312a-312b from the embedding generator 302 conform to a predefined distribution. In some embodiments, the predefined distribution may be Gaussian and continuous, although other predefined distributions (such as a uniform distribution) may be used.

In some embodiments, the system 300 shown in FIG. 3 can be trained in two stages. In the first stage, the classifier 324 is trained to discriminate between related and non-related inputs. In the second stage, the embedding generator 302 and the adversarial discriminator 316 are trained so that the adversarial discriminator 316 causes the embedding generator 302 to produce embeddings that look as if they have been sampled from the predefined distribution p(z). Thus, the embedding portion of the model can be updated during both stages of the training process.

For the first stage of the training, the classifier 324 can be trained using cross entropy with two classes (related and non-related) in some embodiments. This can be expressed as:

$$-\Sigma_{c=1}^{M} y'_c \log(y_c) \qquad (4)$$

where M represents the number of classes (two in this example), y' represents a predicted probability, and y represents a ground truth. For the second stage of the training, the GAN training procedure described above may be used. Depending on the implementation, the approach shown in FIG. 3 may be inherently more stable and involve less tuning of the learning rates between the two losses compared to the approach shown in FIG. 2.

It should be noted here that both approaches shown in FIGS. 2 and 3 may be used to learn a latent musical space by embedding numerous musical passages in the space, and the resulting model in either approach may be used for to perform various functions. For example, a user input may be projected into the latent space in order to identify the closest embedding(s) to the user input. The closest embedding(s) may then be used to identify, rank, play, or generate musical content for the user. It should also be noted here that the execution or use of these approaches may be input-agnostic. That is, the approaches shown in FIGS. 2 and 3 may operate successfully regardless of how musical content and other non-linguistic audible data is represented. Thus, unlike other approaches where performance of a music-based model may be determined by the input representation of data, the approaches here may train a machine learning model using any suitable representation of music. These representations may include symbolic representations of music and raw audio representations of music, such as mel-frequency cepstral coefficients (MFCCs) sequences, spectrograms, amplitude spectrums, or chromagrams.

Although FIGS. 2 and 3 illustrate two examples of systems 200 and 300 for machine learning to identify effective musical features, various changes may be made to FIGS. 2 and 3. For example, the specific machine learning algorithms implementing the embedding generators used to generate the embeddings in FIGS. 2 and 3 may vary from those described above. Also, the numbers of operational layers shown in the various embedding generators, adversarial discriminators, and classifiers may vary as needed or desired.

Figure 4:
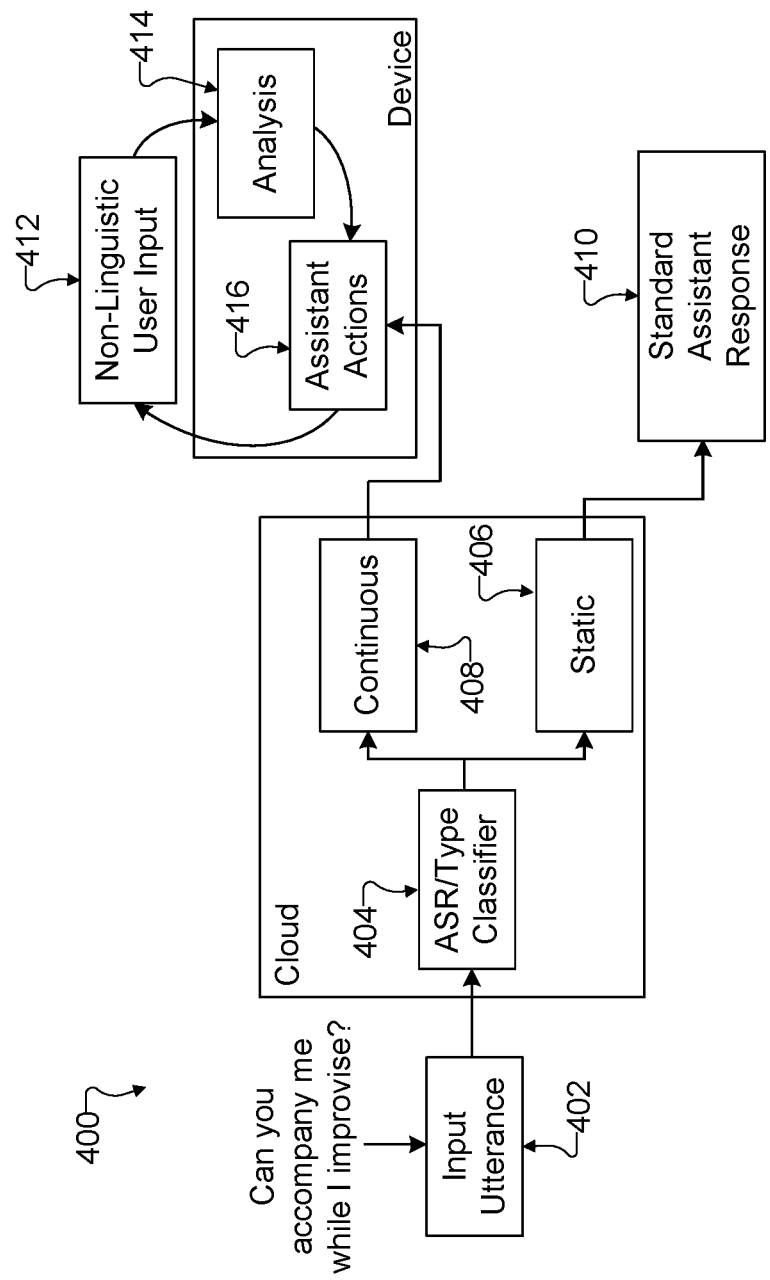
FIGS. 4 and 5 illustrate a first example application for machine learning that is trained to identify effective musical features in accordance with this disclosure.
Figure 5:
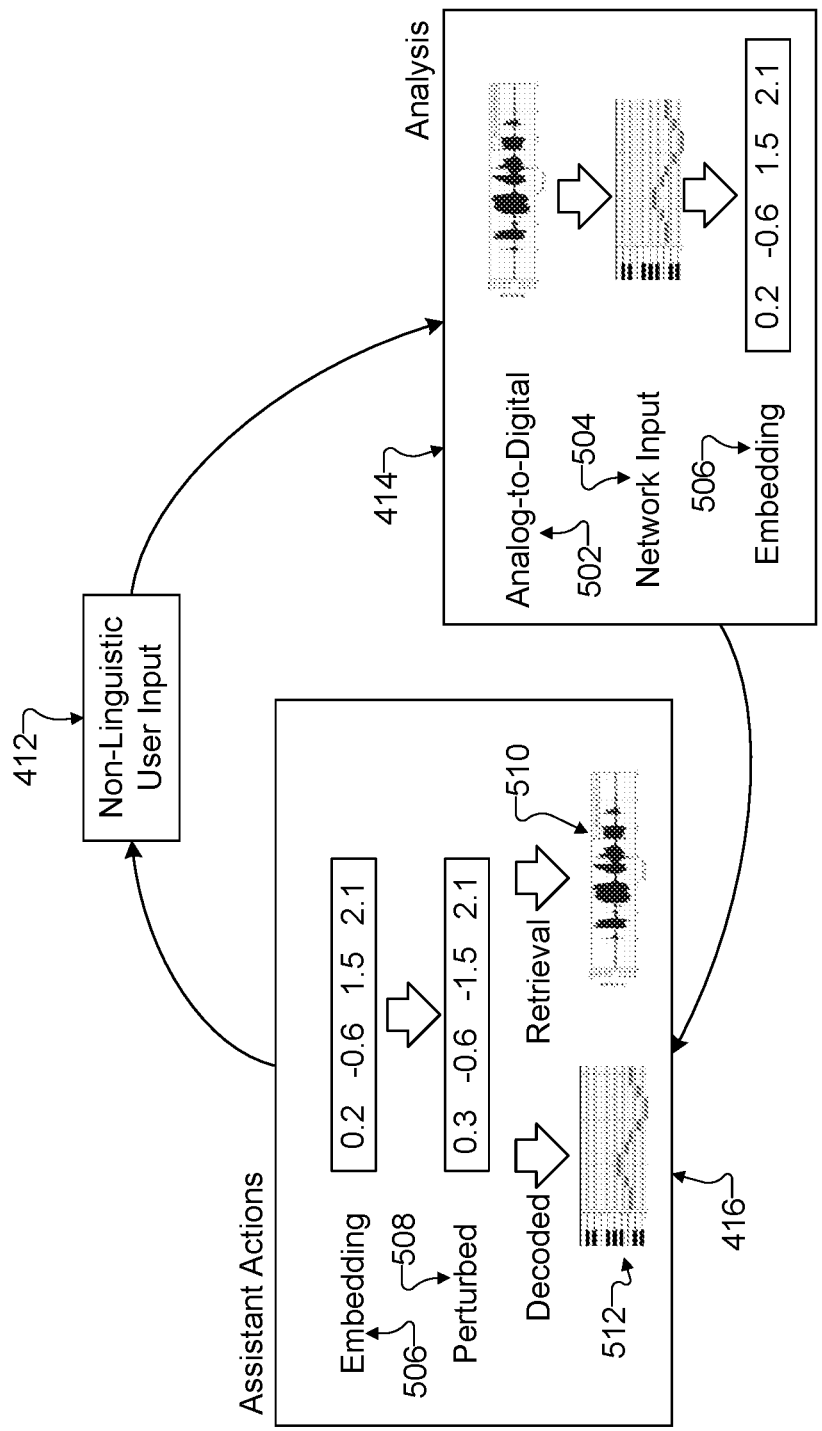

FIGS. 4 and 5 illustrate a first example application 400 for machine learning that is trained to identify effective musical features in accordance with this disclosure. In particular, FIGS. 4 and 5 illustrate a first example way in which a machine learning model (which may be trained as described above) can be used to perform a specific end-user application. The application 400 shown in FIGS. 4 and 5 may be used in the network configuration 100 of FIG. 1, such as when the application 400 is performed using at least one server 106 and at least one electronic device 101, 102, 104 in the network configuration 100 of FIG. 1. Note, however, that the application 400 may be performed using any other suitable device(s) and in any other suitable environment(s).

As shown in FIGS. 4 and 5, an input utterance 402 is received, which in this example represents a request that musical content be generated to accompany a musical performance by at least one user. In some embodiments, the input utterance 402 may be received at a user's electronic device 101, 102, 104 and sensed by at least one sensor 180 (such as a microphone) of the electronic device 101, 102, 104. The input utterance 402 here is digitized and communicated from the electronic device 101, 102, 104 to a cloud-based platform, which may be implemented using one or a number of servers 106.

An automatic speech recognition (ASR) and type classifier function 404 of the cloud-based platform analyzes the digitized version of the input utterance 402 in order to understand the input utterance 402 and to identify a type of action to occur in response to the input utterance 402. For example, the ASR and type classifier function 404 may perform natural language understanding (NLU) in order to derive the meaning of the input utterance 402. The ASR and type classifier function 404 may use the derived meaning of the input utterance 402 in order to determine whether a static function 406 or a continuous function 408 should be used to generate a response to the input utterance 402. The ASR and type classifier function 404 supports any suitable logic to perform speech recognition and to select a type of response to be provided.

If selected, the static function 406 can analyze the input utterance 402 or its derived meaning and generate a standard response 410. The standard response 410 may be provided to the electronic device 101, 102, 104 for presentation to the at least one user. The static function 406 is often characterized by the fact that the processing of the input utterance 402 can be completed once the standard response 410 is provided. In contrast, the continuous function 408 can analyze the input utterance 402 or its derived meaning and interact with the electronic device 101, 102, 104 in order to provide a more continuous response to the user request. In this example, since the request is that musical content be generated to accompany a musical performance, the continuous function 408 may cause the electronic device 101, 102, 104 to generate and play musical content that accompanies the musical performance.

To satisfy the user request here, non-linguistic user input 412 is provided from at least one user and processed by one or more analysis functions 414 of the electronic device 101, 102, 104. The non-linguistic user input 412 here represents the musical performance by the at least one user. For instance, the non-linguistic user input 412 may be generated by one or more users playing one or more musical instruments. The user input 412 is captured by the electronic device 101, 102, 104, such as with a microphone of the electronic device. An analog-to-digital function 502 of the analysis function 414 can be used to convert the captured user input 412 into corresponding digital data, which is used by the analysis function 414 to generate one or more sets of input data 504 for a trained machine learning model (such as the system 200 of FIG. 2 or the system 300 of FIG. 3). The trained machine learning model uses the one or more sets of input data 504 to produce one or more embeddings 506, which represent the user input 412 projected in the learned latent space. Note that while not shown here, various pre-processing operations may be performed on the digitized user input 412 prior to generation of the one or more embeddings 506. Any suitable pre-processing operations may be performed here, such as pitch detection.

The one or more embeddings 506 are used to determine one or more assistant actions 416, which in this example includes playing musical content that accompanies the musical performance (such as via a speaker 190 of the electronic device 101, 102, 104). For example, the one or more embeddings 506 may be perturbed to generate one or more modified embeddings 508. The perturbation of the one or more embeddings 506 may occur in any suitable manner, such as by modifying the values contained in the one or more embeddings 506 in accordance with some specified criteria.

The one or more embeddings 506 and/or the one or more modified embeddings 508 may be used to select or generate musical content to be played to the user(s). For instance, the one or more embeddings 506 and/or the one or more modified embeddings 508 may be used to identify one or more similar embeddings in the latent space as part of a retrieval operation 510. Here, the one or more similar embeddings in the latent space are associated with musical content that is similar to the musical performance, so the electronic device 101, 102, 104 may retrieve and play the musical content associated with the one or more similar embeddings to the user(s). As another example, the one or more modified embeddings 508 may be decoded and used to generate derived musical content at part of a generation operation 512, and the electronic device 101, 102, 104 may play the derived musical content to the user(s). This process can be repeated as more non-linguistic user input 412 is received and additional musical content (whether retrieved or generated) is played to the user(s).

Note that while a single electronic device 101, 102, 104 is described here as being used by at least one user, the application 400 shown in FIGS. 4 and 5 may be performed using multiple electronic devices 101, 102, 104. For example, the input utterance 402 may be received via a first electronic device 101, 102, 104, and musical content may be played via a second electronic device 101, 102, 104. The second electronic device 101, 102, 104 may be identified in any suitable manner, such as based on a previous configuration or based on the input utterance 402.

Figure 6:
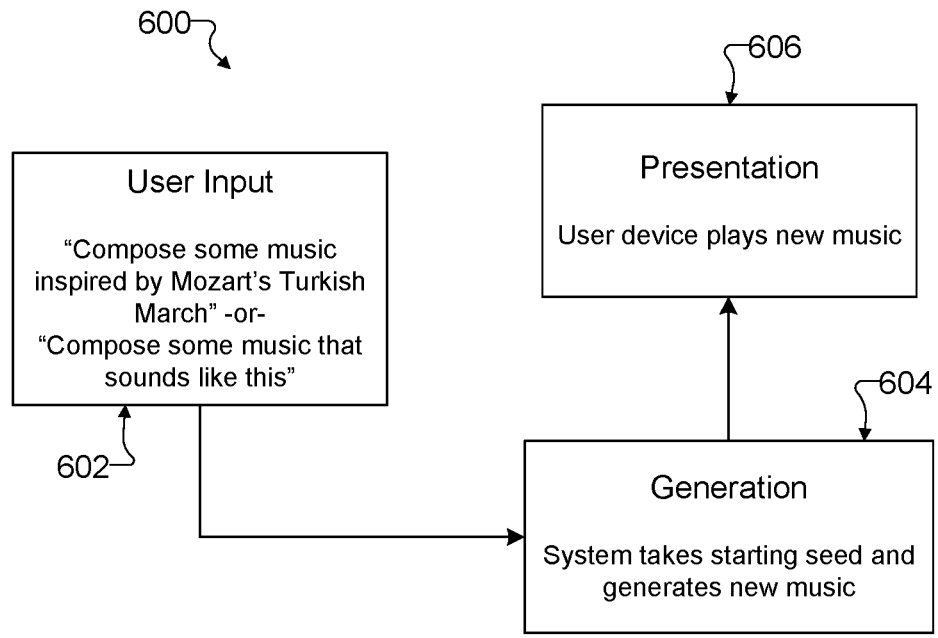
FIGS. 6 and 7 illustrate a second example application for machine learning that is trained to identify effective musical features in accordance with this disclosure.
Figure 7:
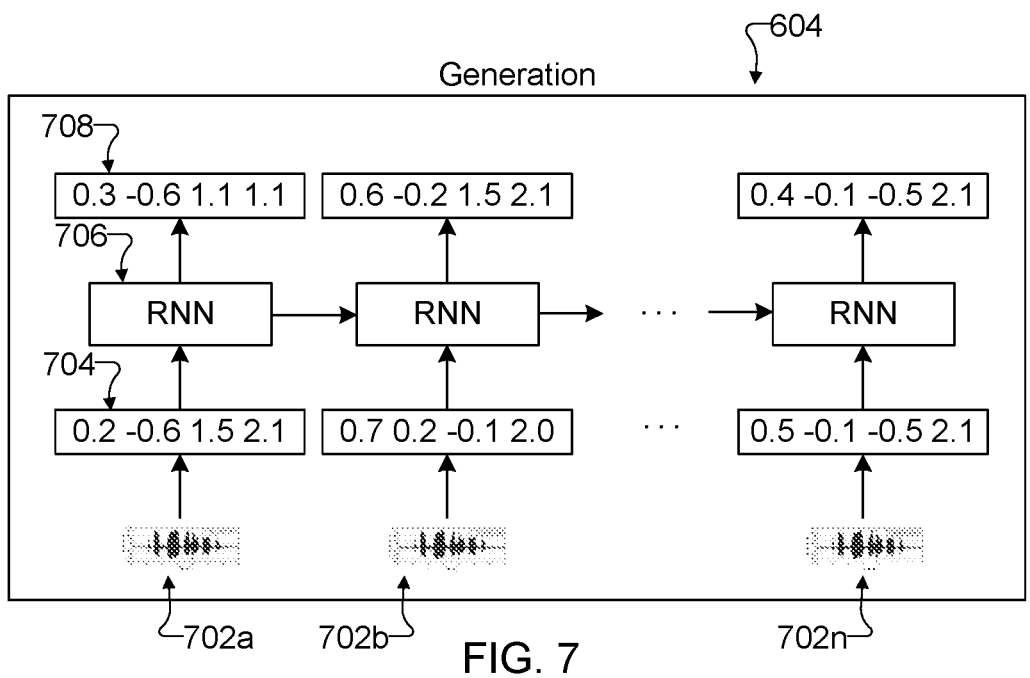

FIGS. 6 and 7 illustrate a second example application 600 for machine learning that is trained to identify effective musical features in accordance with this disclosure. In particular, FIGS. 6 and 7 illustrate a second example way in which a machine learning model (which may be trained as described above) can be used to perform a specific end-user application. The application 600 shown in FIGS. 6 and 7 may be used in the network configuration 100 of FIG. 1, such as when the application 600 is performed using at least one server 106 and at least one electronic device 101, 102, 104 in the network configuration 100 of FIG. 1. Note, however, that the application 600 may be performed using any other suitable device(s) and in any other suitable environment(s).

As shown in FIG. 6, user input 602 is received, which in this example represents a request that musical content be composed. The user input 602 here may make various forms, several examples of which are shown in FIG. 6. For instance, the user input 602 may request the composition of musical content similar to preexisting musical content, or the user input 602 may request the composition of musical content similar to non-linguistic input provided by the user (such as by humming or playing an instrument). Any non-linguistic input provided by the user here may be relatively short in duration, such as between about three seconds to about ten seconds. Although not shown here, the user input 602 may follow a similar path as the input utterance 402 in FIG. 4. That is, the user input 602 may be provided to a cloud-based platform and processed by the ASR and type classifier function 404, which can determine that the continuous function 408 should be used to generate a response to the user input 602.

A generation function 604 uses some specified musical content as a starting seed and generates derived musical content for playback to the user via a presentation function 606. For example, if the user requests the composition of music similar to preexisting musical content, the user's electronic device 101, 102, 104 may identify (or generate) one or more embeddings of the preexisting musical content in the latent space and use the one or more embeddings to produce the derived musical content. If the user requests the composition of music similar to a musical input provided by the user, the user's electronic device 101, 102, 104 may generate one or more embeddings of the user's musical input in the latent space and use the one or more embeddings to produce the derived musical content. As a particular example, the one or more embeddings of the musical input from the user may be used to select a preexisting musical composition whose embedding(s) are similar to the embedding(s) of the musical input from the user, and the preexisting musical composition may be used as a seed.

One example implementation of the generation function 604 is shown in FIG. 7, which illustrates the generation function 604 receiving multiple sets of input data 702a-702n. The input data 702a-702n here represents the seed to be used to generate the derived musical content. In some embodiments, the input data 702a-702n may represent different portions (such as five to ten second segments) of a preexisting musical composition. The preexisting musical composition may represent the preexisting musical content identified specifically by the user, or the preexisting musical composition may represent preexisting musical content selected based on the user's musical input. The input data 702a-702n is converted into different embeddings 704 using a trained machine learning model (such as the system 200 of FIG. 2 or the system 300 of FIG. 3). The embeddings 704 are provided to at least one recurrent neural network (RNN) 706, which processes the embeddings 704 to produce derived embeddings 708. The derived embeddings 708 represent embeddings in the latent space that are generated based on the musical seed represented by the input data 702a-702n. The derived embeddings 708 can then be decoded (similar to the generation operation 512 described above) to produce the derived musical content, which can be played to one or more users.

As shown here, the output generated by the at least one recurrent neural network 706 for at least one set of input data can be provided in a feed-forward manner for use in processing additional sets of input data. This can help the at least one recurrent neural network 706 to generate different portions of the derived musical content that are generally consistent with each other (rather than being significantly different). Effectively, the embeddings 704 produced from the input data 702a-702n can be used to train the at least one recurrent neural network 706. It should be noted that while at least one recurrent neural network 706 is shown as being used here, any other suitable generative machine learning model may be used.

Again, note that while a single electronic device 101, 102, 104 is described here as being used by at least one user, the application 600 shown in FIGS. 6 and 7 may be performed using multiple electronic devices 101, 102, 104. For example, the user input 602 may be received via a first electronic device 101, 102, 104, and musical content may be played via a second electronic device 101, 102, 104. The second electronic device 101, 102, 104 may be identified in any suitable manner, such as based on a previous configuration or based on the user input 602.

Figure 8:
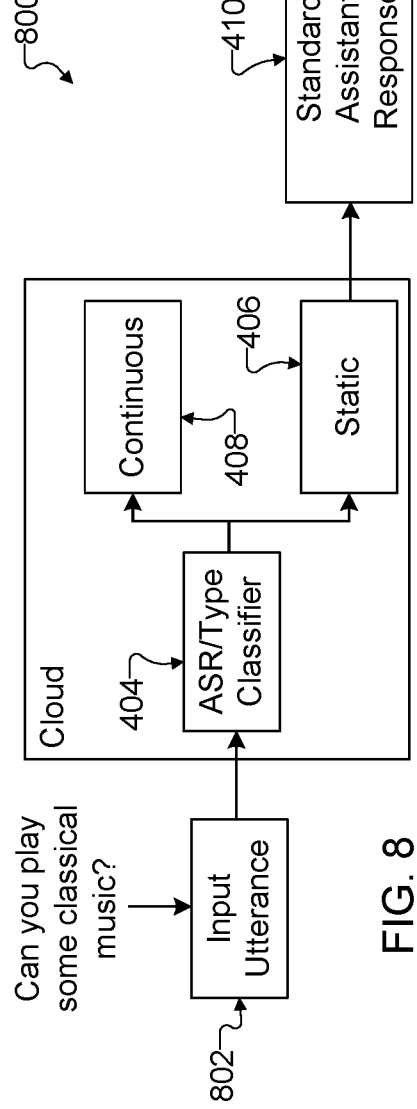
FIGS. 8, 9, and 10 illustrate a third example application for machine learning that is trained to identify effective musical features in accordance with this disclosure.
Figure 9:
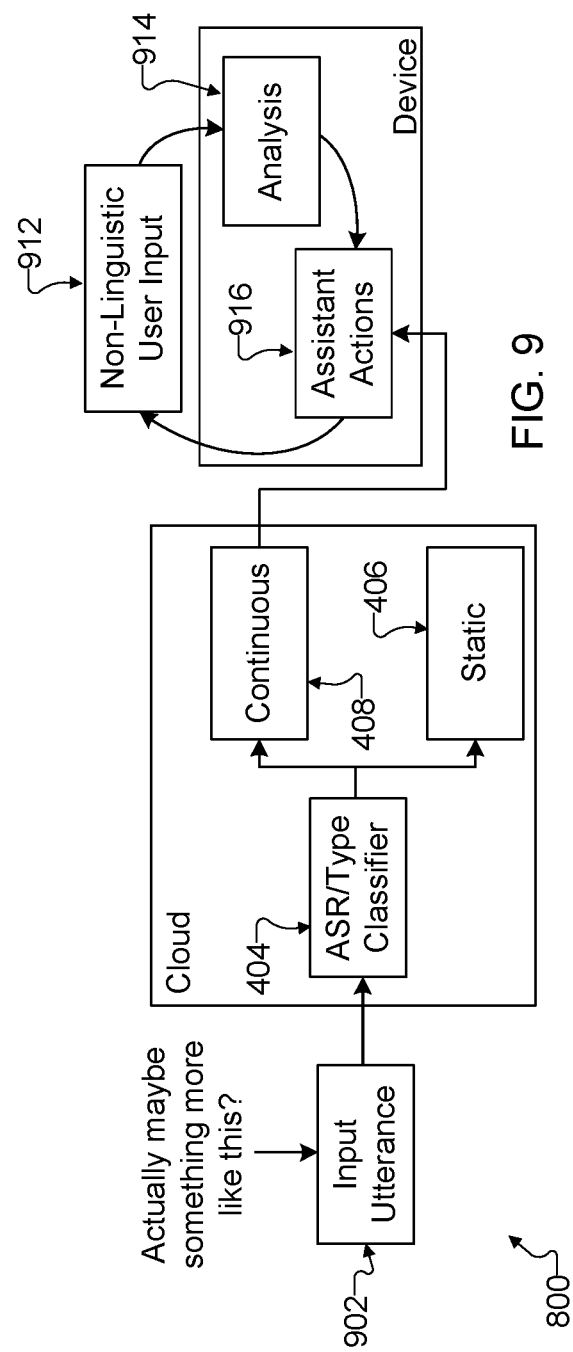
Figure 10:
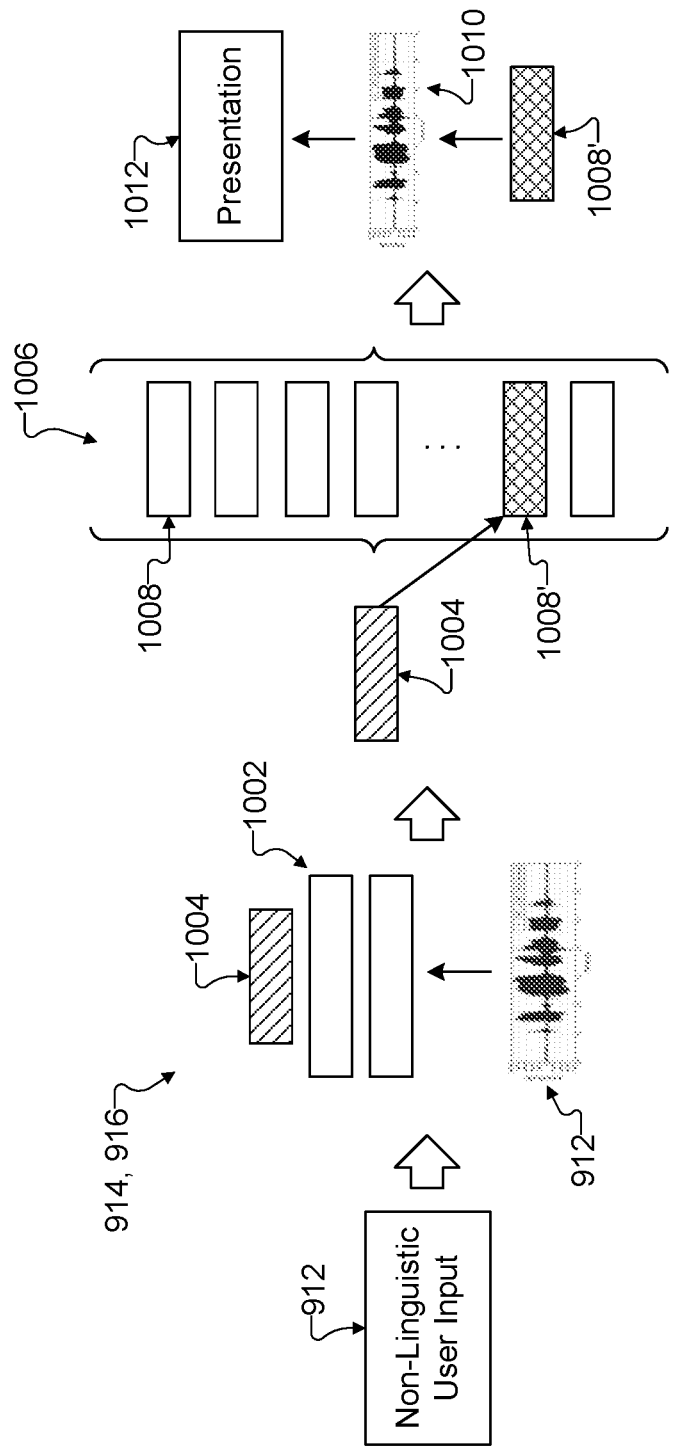

FIGS. 8, 9, and 10 illustrate a third example application 800 for machine learning that is trained to identify effective musical features in accordance with this disclosure. In particular, FIGS. 8, 9, and 10 illustrate a third example way in which a machine learning model (which may be trained as described above) can be used to perform a specific end-user application. The application 800 shown in FIGS. 8, 9, and 10 may be used in the network configuration 100 of FIG. 1, such as when the application 800 is performed using at least one server 106 and at least one electronic device 101, 102, 104 in the network configuration 100 of FIG. 1. Note, however, that the application 800 may be performed using any other suitable device(s) and in any other suitable environment(s).

As shown in FIG. 8, a user may provide an initial input utterance 802, which in this example requests playback of a particular type of music (such as classical music). The input utterance 802 is provided to the cloud-based platform and processed by the ASR and type classifier function 404, which can determine that the static function 406 should be used to generate a response to the input utterance 802. This results in a standard response 410, such as the playback of some form of classical music or other requested musical content.

As shown in FIG. 9, the user may be dissatisfied with the standard response 410 and may provide a subsequent input utterance 902, which in this example requests playback of musical content based on audible data to be provided by the user. The input utterance 902 is provided to the cloud-based platform and processed by the ASR and type classifier function 404, which can determine that the continuous function 408 should be used to generate a response to the input utterance 902.

Non-linguistic user input 912 is provided to the user's electronic device 101, 102, 104, such as in the form of a musical performance or other non-linguistic input sounds. The non-linguistic user input 912 here does not need to represent a specific preexisting song and may instead be improvised in a particular style that the user wishes to hear. One or more analysis functions 914 of the electronic device 101, 102, 104 may convert the non-linguistic user input 912 into one or more embeddings, such as in the same or similar manner as that shown in FIG. 5 and described above. The one or more embeddings are used to determine one or more assistant actions 916, which in this example includes playing classical music or other related musical content (such as via a speaker 190 of the electronic device 101, 102, 104) that is similar to the user input 912. For example, the one or more embeddings of the user input 912 may be used to identify one or more embeddings in the latent feature space that are closest in distance to the embedding(s) of the user input 912, and the musical content that is associated with the one or more identified embeddings in the latent space can be identified and played to the user.

FIG. 10 illustrates one example of how the analysis functions 914 and assistant actions 916 may occur. As shown in FIG. 10, the user input 912 is provided to a trained machine learning model 1002, which may represent the system 200 of FIG. 2 or the system 300 of FIG. 3. The trained machine learning model 1002 uses the user input 912 to generate at least one embedding 1004, which can occur in the manner described above. The at least one embedding 1004 is used to search a learned latent space 1006, which contains embeddings 1008 for other musical content. The search here may, for example, look for one or more embeddings 1008' that are closest neighbors (in terms of Euclidean, cosine, or other distance) from the embedding(s) 1004. The one or more identified embeddings 1008' can be used to retrieve or generate musical content 1010, which is played to the user via a presentation function 1012. In this way, musical content that is similar (based on perceptually relevant musical features) to the user input 912 can be identified, allowing the musical content played to the user to be based on and similar to the user input 912.

Once again, note that while a single electronic device 101, 102, 104 is described here as being used by at least one user, the application 800 shown in FIGS. 8, 9, and 10 may be performed using multiple electronic devices 101, 102, 104. For example, the input utterances 802, 902 may be received via a first electronic device 101, 102, 104, and musical content may be played via a second electronic device 101, 102, 104. The second electronic device 101, 102, 104 may be identified in any suitable manner, such as based on a previous configuration or based on the input utterance 802, 902.

Although FIGS. 4, 5, 6, 7, 8, 9, and 10 illustrate examples of applications for machine learning that is trained to identify effective musical features, various changes may be made to these figures. For example, machine learning that has been trained to identify effective musical features may be used in any other suitable manner without departing from the scope of this disclosure. This disclosure is not limited to the specific end-user applications presented in these figures.

Figure 11:
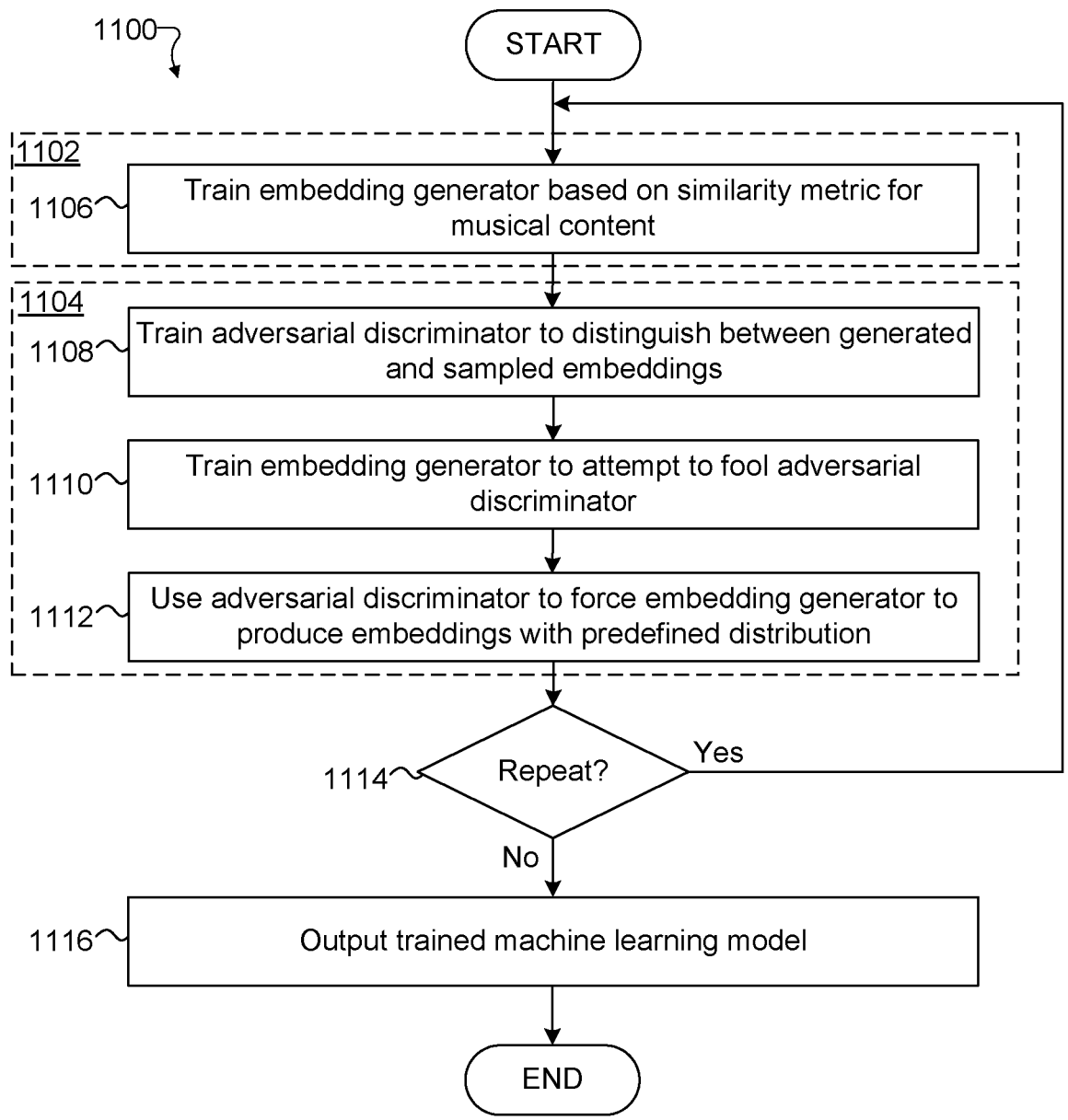
FIGS. 11 and 12 illustrate example methods for machine learning to identify effective musical features in accordance with this disclosure.
Figure 12:
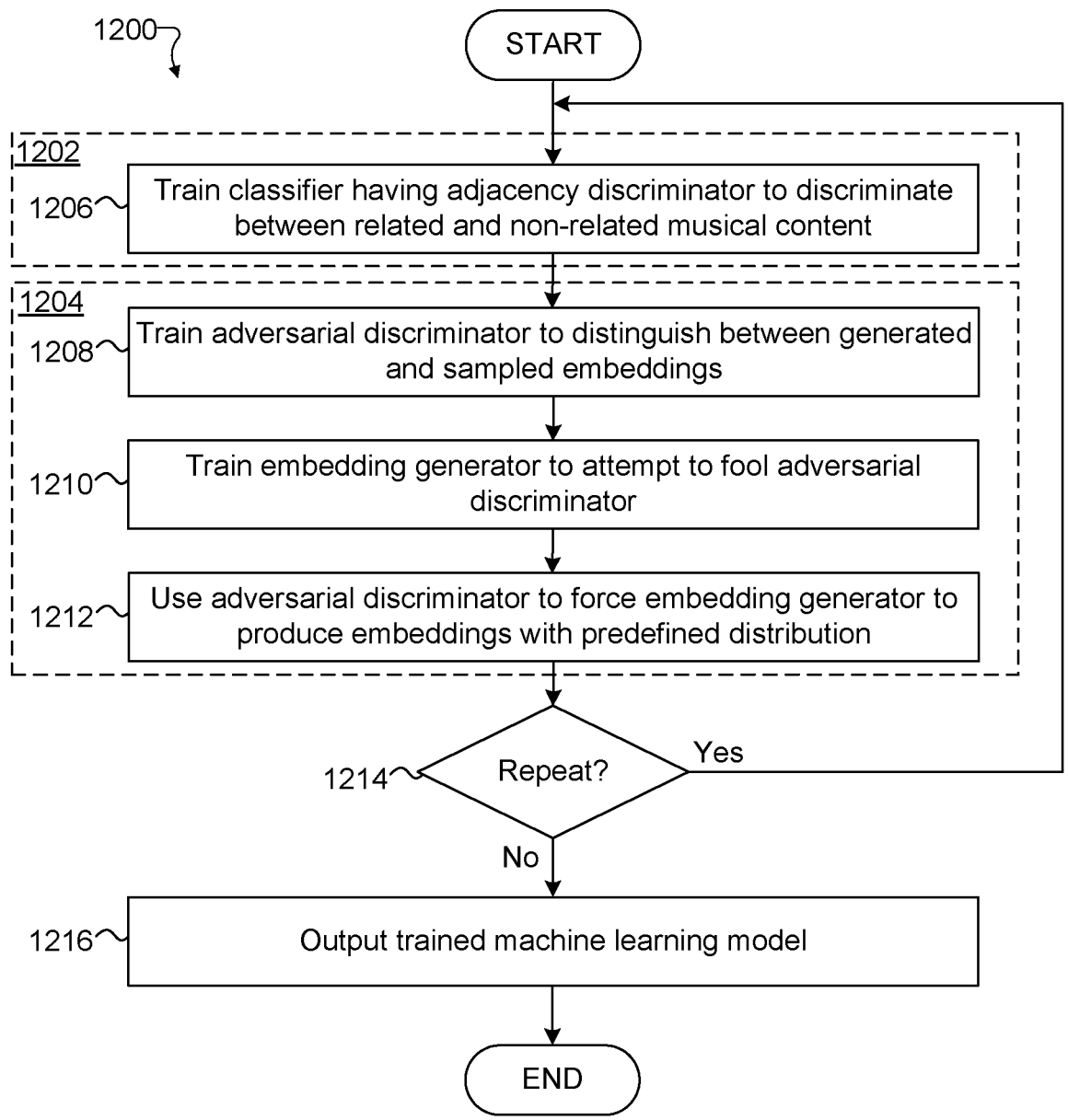

FIGS. 11 and 12 illustrate example methods 1100 and 1200 for machine learning to identify effective musical features in accordance with this disclosure. In particular, FIG. 11 illustrates an example method 1100 for training the machine learning model shown in FIG. 2, and FIG. 12 illustrates an example method 1200 for training the machine learning model shown in FIG. 3. Each of the methods 1100 and 1200 shown in FIGS. 11 and 12 may be performed in the network configuration 100 of FIG. 1, such as when the method 1100 or 1200 is performed by the server 106 in the network configuration 100 of FIG. 1. Note, however, that each of the methods 1100 and 1200 may be performed using any other suitable device(s) and in any other suitable environment(s).

As shown in FIG. 11, training of a machine learning model occurs in multiple stages 1102 and 1104. In the first stage 1102, an embedding generator is trained based on a similarity metric for musical content at step 1106. This may include, for example, the processor 120 of the server 106 using a standard or other suitable DSSM training technique to train the embedding generator 202. During this stage 1102, the embedding generator 202 may be trained based on Euclidean distance, cosine distance, or other distance metric. Also, negative examples can be included in a softmax function here. Overall, during this stage 1102, the embedding generator 202 can be trained to learn its parameters by minimizing the loss function 224.

In the second stage 1104, the machine learning model is trained adversarially by training an adversarial discriminator to distinguish between generated and sampled embeddings at step 1108 and by training the embedding generator to attempt to fool the adversarial discriminator at step 1110. This may include, for example, the processor 120 of the server 106 using a GAN training procedure. Here, the adversarial discriminator 216 is trained to distinguish between generated embeddings 212a-212c from the embedding generator 202 and embeddings sampled from q(z). Also, the embedding generator 202 is trained to fool the adversarial discriminator 216. As a result, the adversarial discriminator is used to force the embeddings produced by the embedding generator to have a predefined distribution at step 1112. This may include, for example, the embedding generator 202 and the adversarial discriminator 216 being trained so that the adversarial discriminator 216 causes the embedding generator 202 to produce embeddings that look as if they have been sampled from the predefined distribution p(z).

A determination is made whether to repeat the training stages at step 1114. This may include, for example, the processor 120 of the server 106 determining whether the loss in Equation (3) above has converged. As a particular example, this may include the processor 120 of the server 106 determining whether computed values of the loss in Equation (3) above have remained within a threshold amount or a threshold percentage of each other for one or more iterations through the stages 1102 and 1104. If not, the process returns to the first training stage 1102. Otherwise, a trained machine learning model has been generated and is output at step 1116. At this point, the trained machine learning model may be placed into use, such as for one or more end-user applications like musical content identification, musical content ranking, musical content retrieval, and/or musical content generation.

As shown in FIG. 12, training of a machine learning model occurs in multiple stages 1202 and 1204. In the first stage 1202, a classifier that includes an adjacency discriminator is trained to discriminate between related and non-related content at step 1206. This may include, for example, the processor 120 of the server 106 training the classifier 324 to recognize that embeddings 312a-312b are related (when the embeddings 312b are for positive input data 310b) or not related (when the embeddings 312b are for negative input data 310b). As noted above, the adjacency discriminator of the classifier 324 can process combined embeddings, such as when each combined embedding represents an embedding 312a and a concatenated embedding 312b. As a particular example, the classifier 324 may be trained using cross entropy with two classes in some embodiments.

In the second stage 1204, the machine learning model is trained adversarially by training an adversarial discriminator to distinguish between generated and sampled embeddings at step 1208 and by training an embedding generator to attempt to fool the adversarial discriminator at step 1210. This may include, for example, the processor 120 of the server 106 using a GAN training procedure. Here, the adversarial discriminator 316 is trained to distinguish between generated embeddings 312a-312b from the embedding generator 302 and embeddings sampled from q(z). Also, the embedding generator 302 is trained to fool the adversarial discriminator 316. As a result, the adversarial discriminator is used to force the embeddings produced by the embedding generator to have a predefined distribution at step 1212. This may include, for example, the embedding generator 302 and the adversarial discriminator 316 being trained so that the adversarial discriminator 316 causes the embedding generator 302 to produce embeddings that look as if they have been sampled from the predefined distribution p(z).

A determination is made whether to repeat the training stages at step 1214. If not, the process returns to the first training stage 1202. Otherwise, a trained machine learning model has been generated and is output at step 1216. At this point, the trained machine learning model may be placed into use, such as for one or more end-user applications like musical content identification, musical content ranking, musical content retrieval, and/or musical content generation.

Although FIGS. 11 and 12 illustrate examples of methods 1100 and 1200 for machine learning to identify effective musical features, various changes may be made to FIGS. 11 and 12. For example, while shown as a series of steps, various steps in each figure may overlap, occur in parallel, occur in a different order, or occur any number of times. Also, any other suitable techniques may be used to train a machine learning model that is designed in accordance with the teachings of this disclosure.

Figure 13:
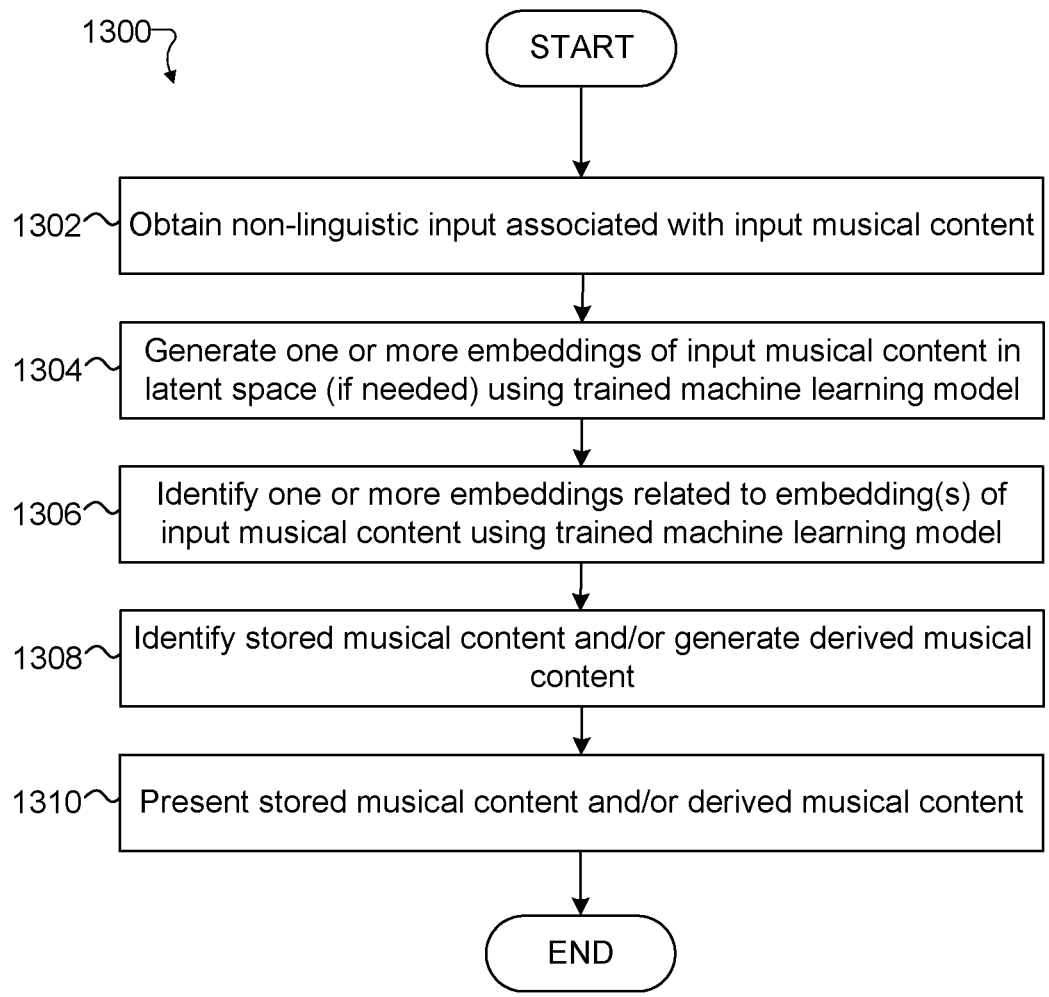
FIG. 13 illustrates an example method for using machine learning that is trained to identify effective musical features in accordance with this disclosure.

FIG. 13 illustrates an example method 1300 for using machine learning that is trained to identify effective musical features in accordance with this disclosure. In particular, FIG. 13 illustrates an example method 1300 for using a machine learning model (which may be trained as described above) to support at least one end-user application. The machine learning model used here has been generated by training a machine learning system having one or more neural networks and one or more adversarial discriminators such that multiple embeddings of musical features in a latent space have a predefined distribution. The method 1300 shown in FIG. 13 may be performed in the network configuration 100 of FIG. 1, such as when the method 1300 is performed by at least one electronic device 101, 102, 104 (possibly in conjunction with at least one server 106) in the network configuration 100 of FIG. 1. Note, however, that the method 1300 may be performed using any other suitable device(s) and in any other suitable environment(s).

As shown in FIG. 13, a non-linguistic input associated with an input musical content is obtained at step 1302. This may include, for example, the processor 120 of the electronic device 101, 102, 104 receiving non-linguistic input from at least one user via a microphone. In these cases, the non-linguistic input may represent a musical performance or sounds associated with a user's request to identify, accompany, compose, or play music. This may also or alternatively include the processor 120 of the electronic device 101, 102, 104 receiving a request to compose music similar to existing musical content. In those cases, the non-linguistic input may represent one or more embeddings of the existing musical content. If necessary, one or more embeddings of the non-linguistic input are generated using a trained machine learning model at step 1304. This may include, for example, the processor 120 of the electronic device 101, 102, 104 projecting a digitized version of the non-linguistic input into a latent musical space using the trained machine learning model.

One or more embeddings related to the embedding(s) associated with the input musical content are identified at step 1306. This may include, for example, the processor 120 of the electronic device 101, 102, 104 identifying one or more embeddings that represent the closest neighbor(s) to the embedding(s) associated with the input musical content, such as by using the trained embedding generator 202 or 302. As noted above, distances between embeddings may be determined using various metrics, such as Euclidean, cosine, or other distance metrics.

The one or more embeddings of input musical content and/or the one or more identified embeddings are used to perform a desired user function. In this example, this includes identifying stored musical content associated with the one or more identified embeddings and/or generating derived musical content at step 1308. This may include, for example, the processor 120 of the electronic device 101, 102, 104 identifying existing musical content associated with the one or more identified embeddings or composing derived musical content based on the one or more identified embeddings. The stored and/or derived musical content is presented at step 1310. This may include, for example, the processor 120 of the electronic device 101, 102, 104 playing the stored and/or derived musical content via at least one speaker 190.

Although FIG. 13 illustrates one example of a method 1300 for using machine learning that is trained to identify effective musical features, various changes may be made to FIG. 13. For example, while shown as a series of steps, various steps in FIG. 13 may overlap, occur in parallel, occur in a different order, or occur any number of times. Also, a machine learning model that is designed in accordance with the teachings of this disclosure may be used in any other suitable manner. As noted above, for instance, the model may be used for musical content identification, musical content ranking, musical content retrieval, and/or musical content generation. In some instances, the same model can be used for at least two of these functions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    receiving a non-linguistic input associated with an input musical content;
    using a model that embeds multiple musical features describing different musical content and relationships between the different musical content in a latent space, identifying one or more embeddings based on the input musical content;
    at least one of: (i) identifying stored musical content based on the one or more identified embeddings or (ii) generating derived musical content based on the one or more identified embeddings; and
    presenting at least one of: the stored musical content or the derived musical content;
    wherein the model is generated by training a machine learning system comprising one or more first neural network components and one or more second neural network components such that:
        embeddings of the musical features in the latent space have a predefined distribution;
        a classifier comprising an adjacency discriminator is trained to classify embeddings of reference musical content generated by the one or more first neural network components as being (i) related to embeddings of positive musical content generated by the one or more first neural network components, the positive musical content similar to the reference musical content, and (ii) not related to embeddings of negative musical content generated by the one or more first neural network components, the negative musical content not similar to the reference musical content; and
        the one or more second neural network components adversarially train the one or more first neural network components to generate the embeddings of the musical features in the latent space having the predefined distribution.

2. The method of claim 1, further comprising:
    using the model to perform at least two of: musical content identification, musical content ranking, musical content retrieval, and musical content generation.

3. The method of claim 1, wherein:
    the non-linguistic input comprises a musical performance by a user; and
    the derived musical content is presented to accompany the musical performance by the user.

4. The method of claim 1, wherein:
the non-linguistic input comprises an embedding of preexisting music in the latent space or musical content provided by a user; and
the derived musical content is presented and comprises composed musical content that is generated based on the preexisting music or the musical content provided by the user.

5. The method of claim 1, wherein:
the non-linguistic input comprises non-linguistic sounds; and
the stored musical content is presented and comprises preexisting music identified based on the non-linguistic sounds.

6. An electronic device comprising:
at least one memory;
at least one speaker; and
at least one processor operatively coupled to the at least one memory and the at least one speaker, the at least one processor configured to:
  receive a non-linguistic input associated with an input musical content;
  using a model that embeds multiple musical features describing different musical content and relationships between the different musical content in a latent space, identify one or more embeddings based on the input musical content;
  at least one of: (i) identify stored musical content based on the one or more identified embeddings or (ii) generate derived musical content based on the one or more identified embeddings; and
  present, via the at least one speaker, at least one of: the stored musical content or the derived musical content;
wherein the model is generated by training a machine learning system comprising one or more first neural network components and one or more second neural network components such that:
  embeddings of the musical features in the latent space have a predefined distribution;
  a classifier comprising an adjacency discriminator is trained to classify embeddings of reference musical content generated by the one or more first neural network components as being (i) related to embeddings of positive musical content generated by the one or more first neural network components, the positive musical content similar to the reference musical content, and (ii) not related to embeddings of negative musical content generated by the one or more first neural network components, the negative musical content not similar to the reference musical content; and
  the one or more second neural network components adversarially train the one or more first neural network components to generate the embeddings of the musical features in the latent space having the predefined distribution.

7. The electronic device of claim 6, wherein the at least one processor is further configured to use the model to perform at least two of: musical content identification, musical content ranking, musical content retrieval, and musical content generation.

8. The electronic device of claim 6, wherein:
the non-linguistic input comprises a musical performance by a user; and
the at least one processor is configured to present the derived musical content to accompany the musical performance by the user.

9. The electronic device of claim 6, wherein:
the non-linguistic input comprises an embedding of preexisting music in the latent space or musical content provided by a user; and
the at least one processor is configured to present the derived musical content comprising composed musical content that is generated based on the preexisting music or the musical content provided by the user.

10. The electronic device of claim 6, wherein:
the non-linguistic input comprises non-linguistic sounds; and
the at least one processor is configured to present the stored musical content comprising preexisting music identified based on the non-linguistic sounds.

11. A non-transitory machine-readable medium containing instructions that when executed cause at least one processor of an electronic device to:
  receive a non-linguistic input associated with an input musical content;
  using a model that embeds multiple musical features describing different musical content and relationships between the different musical content in a latent space, identify one or more embeddings based on the input musical content;
  at least one of: (i) identify stored musical content based on the one or more identified embeddings or (ii) generate derived musical content based on the one or more identified embeddings; and
  present at least one of: the stored musical content or the derived musical content;
wherein the model is generated by training a machine learning system comprising one or more first neural network components and one or more second neural network components such that:
  embeddings of the musical features in the latent space have a predefined distribution;
  a classifier comprising an adjacency discriminator is trained to classify embeddings of reference musical content generated by the one or more first neural network components as being (i) related to embeddings of positive musical content generated by the one or more first neural network components, the positive musical content similar to the reference musical content, and (ii) not related to embeddings of negative musical content generated by the one or more first neural network components, the negative musical content not similar to the reference musical content; and
  the one or more second neural network components adversarially train the one or more first neural network components to generate the embeddings of the musical features in the latent space having the predefined distribution.

12. The non-transitory machine-readable medium of claim 11, further containing instructions that when executed cause the at least one processor of the electronic device to use the model to perform at least two of: musical content identification, musical content ranking, musical content retrieval, and musical content generation.

13. The non-transitory machine-readable medium of claim 11, wherein:
the non-linguistic input comprises a musical performance by a user; and the derived musical content is presented to accompany the musical performance by the user.

14. The non-transitory machine-readable medium of claim 11, wherein:
the non-linguistic input comprises an embedding of preexisting music in the latent space or musical content provided by a user; and
the derived musical content is presented and comprises composed musical content that is generated based on the preexisting music or the musical content provided by the user.

15. The non-transitory machine-readable medium of claim 11, wherein:
the non-linguistic input comprises non-linguistic sounds; and
the stored musical content is presented and comprises preexisting music identified based on the non-linguistic sounds.

16. The method of claim 1, wherein the one or more second neural network components adversarially train the one or more first neural network components using a generative adversarial network (GAN) training procedure.

17. The electronic device of claim 6, wherein the one or more second neural network components adversarially train the one or more first neural network components using a generative adversarial network (GAN) training procedure.

18. The non-transitory machine-readable medium of claim 11, wherein the one or more second neural network components adversarially train the one or more first neural network components using a generative adversarial network (GAN) training procedure.

19. The method of claim 1, further comprising:
using the model to perform musical content identification, musical content ranking, and musical content retrieval.

20. The electronic device of claim 6, wherein the at least one processor is further configured to use the model to perform musical content identification, musical content ranking, and musical content retrieval.

21. The non-transitory machine-readable medium of claim 11, further containing instructions that when executed cause the at least one processor of the electronic device to use the model to perform musical content identification, musical content ranking, and musical content retrieval.

* * * * *